Oct. 7, 1924.
E. A. HORNBOSTEL
ATTACHMENT FOR GAS STOVES
Filed Aug. 8, 1921
1,511,078
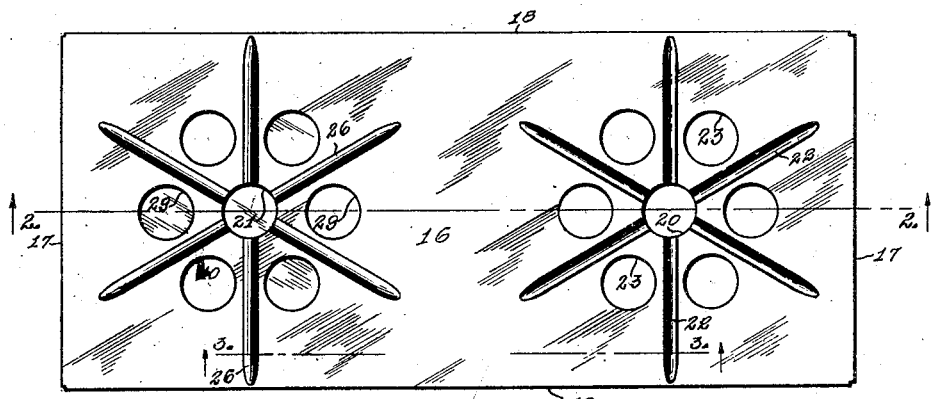
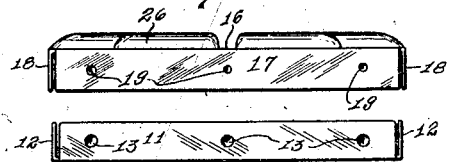
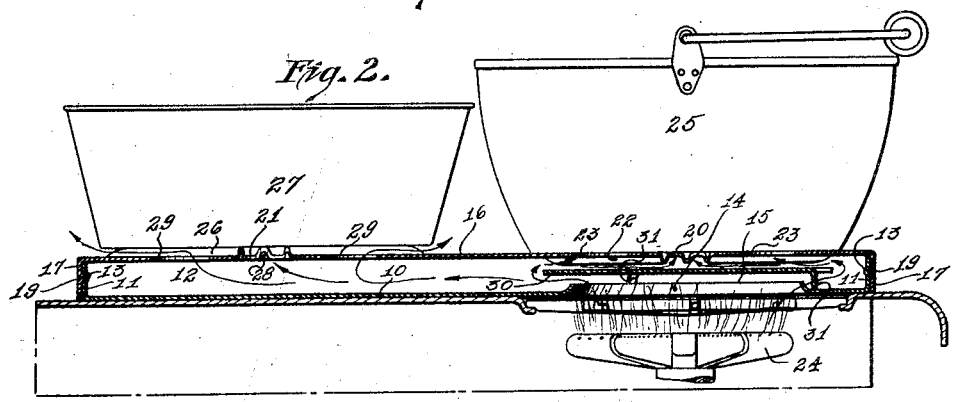
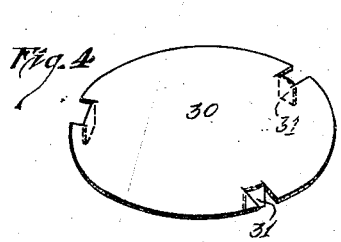
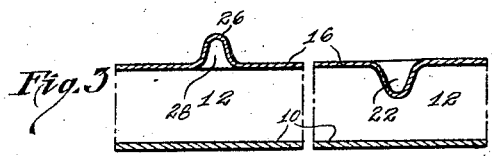
Inventor
Ernest A. Hornbostel
by Orwig & Hague Attys.

Patented Oct. 7, 1924.

1,511,078

UNITED STATES PATENT OFFICE.

ERNEST A. HORNBOSTEL, OF DES MOINES, IOWA.

ATTACHMENT FOR GAS STOVES.

Application filed August 8, 1921. Serial No. 490,594.

*To all whom it may concern:*

Be it known that I, ERNEST A. HORNBOSTEL, a citizen of the United States, and resident of Des Moines, in the county of Polk and State of Iowa, have invented a certain new and useful Attachment for Gas Stoves, of which the following is a specification.

The object of my invention is to provide a simple, durable and inexpensive device in the nature of an attachment which may be applied to gas stoves in such a manner that the heat that is ordinarily wasted by heating the contents of a vessel over a given burner may be directed to another vessel for the purpose of keeping the contents of the second vessel warm, or for slow cooking.

A further object is to provide in a devcie above mentioned, a detachable heat modifying device between the flames of a burner from which the heat is derived and the vessel immediately above the burner so that vegetables and fruits may be cooked within the vessel without sticking to the bottom.

A further object is to provide in an attachment for gas stoves of that class which is in the form of a heat chamber having top and bottom spaced plates and connecting walls to form a heat chamber, the bottom plate being provided with an opening to receive the flames of a gas burner, means for detachably connecting the plates in position relative to each other in such a manner that they may be easily separated for cleaning.

These and other objects will be apparent to those skilled in the art.

My invention consists in the construction, arrangement and combination of the various parts of the device, whereby the objects contemplated are attained, as hereinafter more fully set forth, pointed out in my claim, and illustrated in the accompanying drawings, in which:

Figure 1 is a plan view of my improved device.

Figure 2 is a longitudinal sectional view taken on the line 2—2 of Figure 1.

Figure 3 is a detail sectional view taken on the line 3—3 of Figure 1.

Figure 4 is a perspective view of the heat deflector plate.

Figure 5 is an end elevation showing the upper and lower plates in a separated position.

My improved device comprises a bottom plate 10 having end members 11 and side members 12, the said plate being formed of a single piece of metal with its sides and end members bent at right angles to the member 10.

Each of the end members 11 is provided with a series of depressions 13 which extend inwardly. The member 10 is provided with an opening 14 near one end and centrally between its sides. This opening has its edges provided with a slightly upwardly turned flange 15.

A top plate 16 is also provided having a series of end members 17 and side members 18, said end members 17 being provided with a series of inwardly extending depressions 19. The said side and end members 17 and 18 are so arranged that they will telescopically receive the side and end members 11 and 12 of the plate 10 with the depressions 19 within the depressions 13, as clearly shown in Figure 2.

This provides means whereby the two plates may be easily and quickly separated from each other when it is so desired for the purpose of cleaning and so forth.

When the plate 16 is in position relative to the plate 10, the two plates are substantially parallel with each other.

The member 10 is designed to rest on the top of a gas stove or similar heating device with the opening 14 immediately above one of the gas burners, which is designated in the drawings by the numeral 24, in such a manner that the heat from the burner will pass upwardly through the opening 14 into the interior of the chamber between the plates 10 and 16.

The plate 16 is provided at one end with an opening 20 and at the opposite end with an opening 21, the opening 20 being designed to rest centrally above the opening 14 of the plate 10.

The plate 16 is provided with a series of depressions 22 which are preferably pressed in the metal, and radiating from the opening 20. The depressions 22 form a series of downwardly extending flanges on the under face of the plate 16, and serve to reinforce the said plate against buckling due to the weight of the container above, and also against buckling due to the uneven expansion of the plate 16, due to the flame hereinafter to be described.

Arranged in a circular manner and between each of the depressions 22, I have provided an opening 23 which is to permit the heat from the burner to be conducted to a container 25 above the said openings 20 and 23.

The top of the plate 16 at the point where the openings 20 and 23 are provided is designed to be perfectly smooth with the exception of the grooves 22, so that the bottom of the container 25 will rest against the top of the plate 16.

The top of the plate 16 adjacent to the opening 21 is provided with a series of upwardly extending flanges 26 radiating from the said opening. These flanges are for the purpose of holding the container 27 a slight distance above the plate 16, and also to reinforce the said plate 16, and to prevent the same from buckling due to uneven temperatures, the flanges 26 being formed by pressing the metal upward which leaves the grooves 28 on the under surface.

The space between each of the flanges 26 is provided with an opening 29 similar to the opening 23, and are for the purpose of permitting heat within the chamber to pass upwardly between the flanges 26 and beneath the container 27.

By this arrangement, it will be seen that I have provided a device which may be placed above the gas stove with the openings 14 above one of the burners in such a manner that the heat from the said burner will strike the ends 17 at a point below the container 25, and a large amount of the said heat will be radiated and conducted to the bottom of said container, part of it through the opening 23 and part of it through the top member 16.

It is a well known fact that in order to supply combustion to the gas flames, that a large amount of air must be supplied to the flames, which has to be circulated beneath the bottom of the container being heated. This hot air is conducted between the plates 10 and 16 and out through the openings 21 and 29 so as to be brought into engagement with the bottom of the container 27. Further heat will then be given to the bottom of the container 27 which would otherwise go to waste by the hot air passing up around the sides of the container 25, if the said container 25 is placed immediately above the gas burner as is commonly practiced in the ordinary gas stoves.

Thus is will be seen that I have provided means which will utilize a large per cent of heat which is usually wasted and carried away by the gases of combustion, in order to provide against heat from the burner 24 striking the bottom of the container 25 directly, and thereby burning certain things which may be cooking within the container, such as preserves, jellies, and so forth.

I have provided a disk 30 which is formed with a number of laterally extending legs 31 from one of its faces. These legs are preferably formed by being cut out of the said disk and then being bent laterally.

The disk 30 is of such a size and diameter that the legs 31 may be placed on the member 10 at a point just outside of the flange 15. The said legs are of such length that the plate 30 will rest substantially midway between the plates 10 and 16, as clearly shown in Figure 2.

This member 30 may be placed in position when so desired by first removing the plate 16 from the plate 10. After the said member 30 is in position, the said plate 16 may then be replaced. The heat from the flames of the burner 24 will then pass around the edges of the plate 30 and a portion of it will be radiated through said plate and also through the bottom of the container 25, and slow cooking within the container may be accomplished without burning the same.

One of the advantages of my improved device lies in the fact that the plates 10 and 16 may be separated from each other for the purpose of cleaning between them. This is easily accomplished by placing the fingers of one hand in the hole 14 and those of the opposite hand in some of the holes 23 and pulling the two members apart. The spring in the members 17 and 11 is sufficient to yieldingly hold the members 19 within the members 13.

Another advantage of my construction lies in the fact that the downwardly extending ribs 22 and the ribs 26 are exactly the same, except one is pressed downwardly while the other is pressed upwardly. Both of these openings may be formed with a single die, the plate 16 being turned over after one set of openings have been formed.

I claim as my invention:

A heater attachment for gas stoves comprising upper and lower plates, each of said plates being provided with side and end members, the side and end members of one plate being designed to telescopically receive the side and end members of the opposite plate, a plurality of openings in the top member and an opening in the bottom member, the opening of said bottom member being opposite from one of the openings of said top member, the opening of said bottom member being provided with an upwardly extending annular flange, a circular deflector plate having a series of downwardly extending legs, the legs of said plate being designed to detachably rest outside of the side of said annular flange said deflector plate being spaced midway between and parallel with the said upper and lower plates.

Des Moines, Iowa, June 18, 1921.

ERNEST A. HORNBOSTEL.